US011861794B2

United States Patent
Ruzhytskyi (10) Patent No.: US 11,861,794 B2
(45) Date of Patent: Jan. 2, 2024

(54) SYSTEM, METHOD, AND COMPUTER PROGRAM PRODUCT USING DIGITAL ENVIRONMENT FOR MEMORY TRAINING

(71) Applicant: Encoder Inc., Lewes, DE (US)

(72) Inventor: Oleksii Ruzhytskyi, Vyshgorod (UA)

(73) Assignee: ENCODER INC., Lewes, DE (US)

( * ) Notice: Subject to any disclaimer, the term of this patent is extended or adjusted under 35 U.S.C. 154(b) by 89 days.

(21) Appl. No.: 17/552,708

(22) Filed: Dec. 16, 2021

(65) Prior Publication Data

US 2022/0189121 A1 Jun. 16, 2022

Related U.S. Application Data

(60) Provisional application No. 63/126,375, filed on Dec. 16, 2020.

(51) Int. Cl.
*G06T 19/00* (2011.01)
*G06F 3/01* (2006.01)

(52) U.S. Cl.
CPC ............ *G06T 19/003* (2013.01); *G06F 3/011* (2013.01); *G06T 19/006* (2013.01); *G06T 2215/16* (2013.01); *G06T 2219/028* (2013.01)

(58) Field of Classification Search
None
See application file for complete search history.

(56) References Cited

U.S. PATENT DOCUMENTS 10,943,407 B1 * 3/2021 Morgan ................ G16H 15/00

OTHER PUBLICATIONS

Krokos et al., Virtual memory palaces: immersion aids recall, Virtual Realty (2019) 23:1-15 (Year: 2019).*
Huang et al., The Effects of Visual Realism on Spatial Memory and Exploration Pattern in Virtual Reality, VRST '20 Nov. 1-4, 2020, Virtual Event, Canada (Year: 2020).*
Magen et al., Spatial Organization in Self-Initiated Visual Working Memory, Frontiers in Psychology, Dec. 2019, vol. 19 Article 2734 (Year: 2019).*
Münzer, Facilitating spatial perspective taking through animation: Evidence from an aptitude-treatment-interaction, Learning and Individual Differences 22 (2012) 505-510 (Year: 212).*
Magen et al., Encoding strategies in self-initiated visual working memory, Memory & Cognition (2018) 46:1093-1108 (Year: 2018).*

* cited by examiner

*Primary Examiner* — Yingchun He
(74) *Attorney, Agent, or Firm* — L/O OF ALEXIS J SAENZ (57) ABSTRACT

A system, software application and process help the user memorize a digital environment through the process of actions the users have to perform. The embodiments provide generating a digital environment including a first virtual room. A first set of digital objects in pre-defined locations of the first virtual room is generated. The first virtual room and the digital objects in the pre-defined locations are displayed. An acknowledgement from the user that the user has memorized positions of each of the digital objects in the first virtual room is received. The objects are removed. Selection of the digital objects and their placement in the first virtual room is received. The system determines whether every digital object was placed in a correct location and in response, generates a second virtual room including a second set of digital objects for further memory training.

13 Claims, 12 Drawing Sheets

SYSTEM, METHOD, AND COMPUTER PROGRAM PRODUCT USING DIGITAL ENVIRONMENT FOR MEMORY TRAINING

CROSS-REFERENCE TO RELATED APPLICATION

This application claims benefit under 35 U.S.C. § 119(e) of U.S. Provisional Application having Ser. No. 63/126,375 filed Dec. 16, 2020, which is hereby incorporated by reference herein in its entirety.

FIELD

The subject disclosure relates to digital environments, and more particularly to a system, method, and computer program product using a digital environment for memory training.

BACKGROUND

Mnemonic techniques have been around since ancient Greece. The core mechanism of these techniques lies in the ability to see needed information as a vivid image, and then link this to a specific object which is located on the path of a well-known location. One memory technique is called the memory palace (also known as the mind palace or method of loci) which allows people to encode, store and successfully retrieve large amounts of various information in association with a location.

One's memory capacity directly depends on the size of the memory palace which is constructed from physical environments. As for today, mastering the memory palace technique is problematic due to the: 1) limited number of familiar and constant (unchangeable) real locations; 2) familiar locations are usually "contaminated" with a large number of unnecessary items, which are distracting for the memory palace technique; 3) the time and effort it takes to construct and remember a usable memory palace out of known locations; and 4) once personal familiar environments run out, people struggle to expand their memory palaces further.

As can be seen, there is a need for an improved system that provides people with an easy, efficient and systematic approach for memorization.

SUMMARY

In one aspect of the disclosure, a computer program product for generating a memory training environment is disclosed. The computer program product comprises a non-transitory computer readable storage medium having computer readable program code embodied therewith. The computer readable program code is configured, when executed by a processor, to: generate a digital environment including a first virtual room; generate a first set of digital objects in pre-defined locations of the first virtual room; display the first virtual room and the digital objects in the pre-defined locations to a user; receive an acknowledgement from the user that the user has memorized positions of each of the digital objects in the first virtual room; remove the digital objects from the first virtual room; receive a selection of the digital objects and placement of the digital objects in the first virtual room by the user; determine whether every digital object was placed in a correct location of the first virtual room, wherein a correct location corresponds to the pre-defined locations; and generate a second virtual room including a second set of digital objects in the event the user placed every object in the correct location of the first virtual room.

In another aspect of the disclosure, a method for generating a memory training environment is disclosed. The method provides generating a digital environment including a first virtual room; generating a first set of digital objects in pre-defined locations of the first virtual room; displaying the first virtual room and the digital objects in the pre-defined locations to a user; receiving an acknowledgement from the user that the user has memorized positions of each of the digital objects in the first virtual room; removing the digital objects from the first virtual room; receiving a selection of the digital objects and placement of the digital objects in the first virtual room by the user; determining whether every digital object was placed in a correct location of the first virtual room, wherein a correct location corresponds to the pre-defined locations; and generating a second virtual room including a second set of digital objects in the event the user placed every object in the correct location of the first virtual room.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, and referring to the Figures, embodiments of the subject technology provide an electronic digital environment for memorization of environments, applicable as memory palaces for memorization techniques. In some embodiments, the environments may be pre-made. The term "digital" may refer to an electronic application which may involve two or three dimensional displays. As will be discussed herein, embodiments will refer to "digital environments", which may include electronic scenes displayed on electronic displays of computing devices and may include two dimensional graphics, augmented reality, virtual reality, and immersive virtual reality.

It should be appreciated that aspects of the subject technology provide more than merely a memorization training program. The subject technology incorporates computing elements to generate a new technology to provide memory training for individuals. The underlying process creates environments that an end user engages with to develop and strengthen one's memory. The environments are digital and in some embodiments, use virtual reality or augmented reality to create the different environments (for example, rooms, scenes, or the like). Some embodiments provide the subject technology as a software application which may generate new rooms on request for the user to continually train memorization. Object generation and placement may include a computing engine to determine object location which may be repetitive for some rooms or randomly rearranged in other rooms. In addition, some embodiments may incorporate animation with some objects as a means to invoke memory association with the object as a user is memorizing an environment. As should be understood, such environment generation, object generation, and recreation of environments as will be described further herein are not reasonably performed manually. The underlying processes rely on technology to provide the digital environments and recreation of the environments. The physical counterpart would require other people to actively engage in being present as the user is memorizing the room, actively removing objects, and actively remembering themselves whether objects are replaced in their correct positions. In the context of generating new rooms on request by a user, such a physical endeavor is impractical and unreasonable given the limited number of rooms physically available to use or the physical limitations in constantly reconstructing new rooms.

Figure 1:
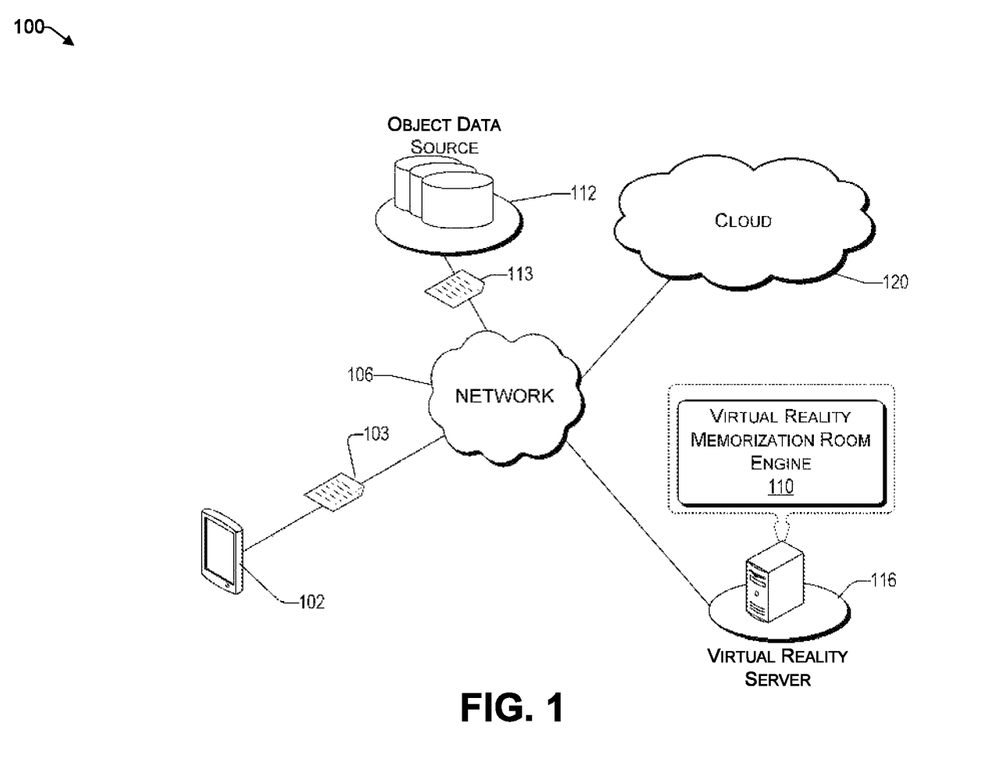
FIG. 1 is a block diagram of an architecture for a virtual reality memory training system according to an embodiment of the subject technology.

Referring now to FIG. 1, an example architecture 100 for a virtual reality memory training system is shown. The architecture 100 includes a network 106 that allows an end user computing device 102 to communicate with other computing devices, as well as other elements that are connected to the network 106, such as an item object data source 112, a virtual reality (VR) server 116, and the cloud 120. In the context of providing an online memorization environment session, the computing device 102 may provide requests/input data (represented as data messages 103) which are processed by the VR memorization room engine 110. Generally, the VR memorization room engine 110 makes requests to the object data source 112 for objects and their associated data 113 (for example, object type, object animation, location position, etc.) and builds environments using the object data 113. In some embodiments, the VR memorization room engine 110 may generate rooms with anchors indicating locations for object placement. The objects and their associated anchors may be permanent or session dependent as indicated in object data 113.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. In cloud based embodiments, resources may be gathered from different computing devices connected to the cloud network.

In an illustrative embodiment, users may interface with the architecture 100 through a VR platform, represented by computing device 102. While a generic mobile computing device is shown, it will be understood that other computing devices including interactive head worn modules may be used. In some embodiments, a software application may provide a user interface (UI) through which the user may perform memorization training using aspects of the subject technology.

While the object data source 112 and the VR memorization room engine 110 are illustrated by way of example to be on different platforms, it will be understood that in various embodiments, the object data source 112 and the virtual reality server 116 may be combined. In other embodiments, these computing platforms may be implemented by virtual computing devices in the form of virtual machines or software containers that are hosted in a cloud 120, thereby providing an elastic architecture for processing and storage.

Figure 2A:
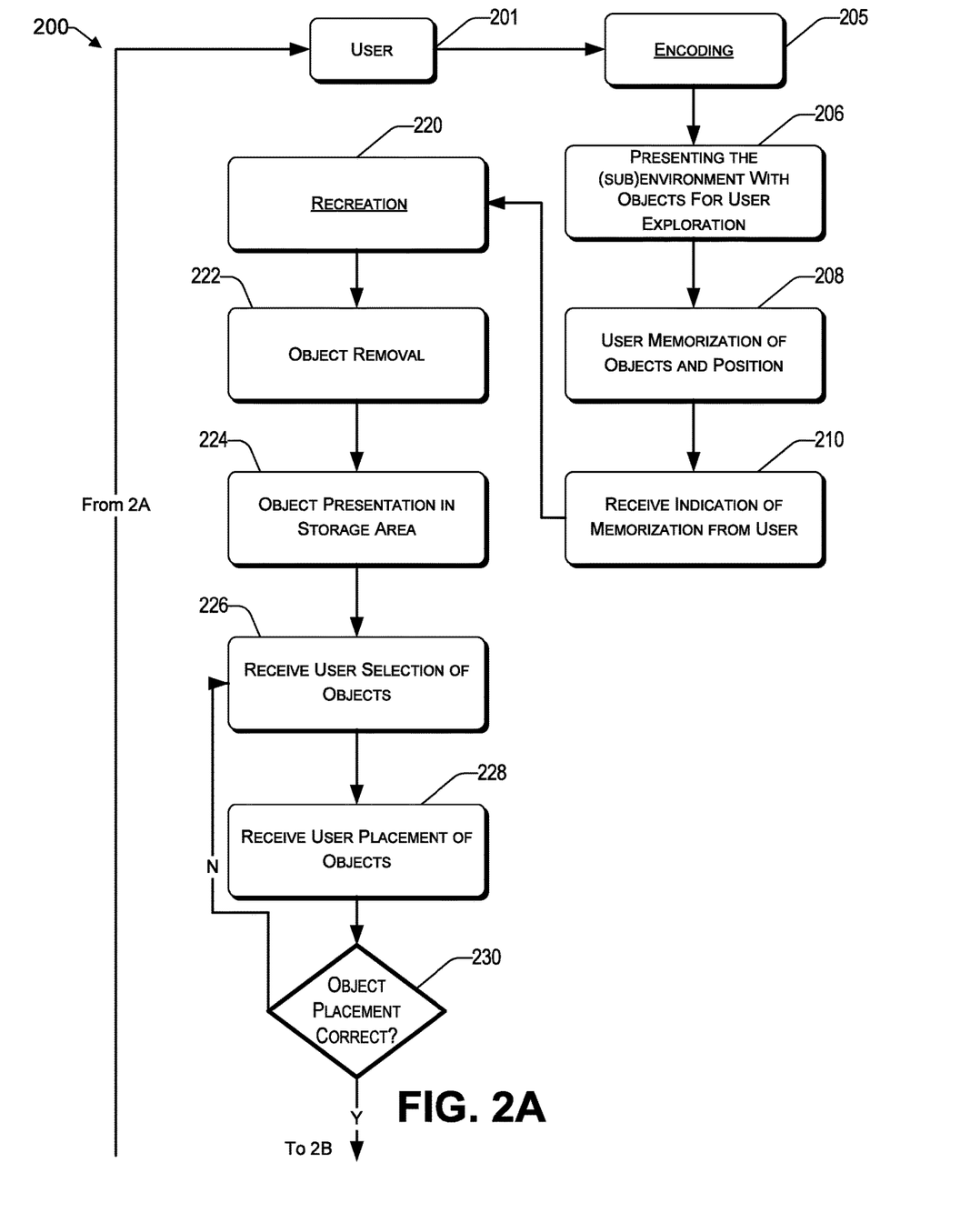
FIGS. 2A-2B are a flowchart of a process for generating a virtual reality memory training environment according to an embodiment of the subject technology.
Figure 2B:
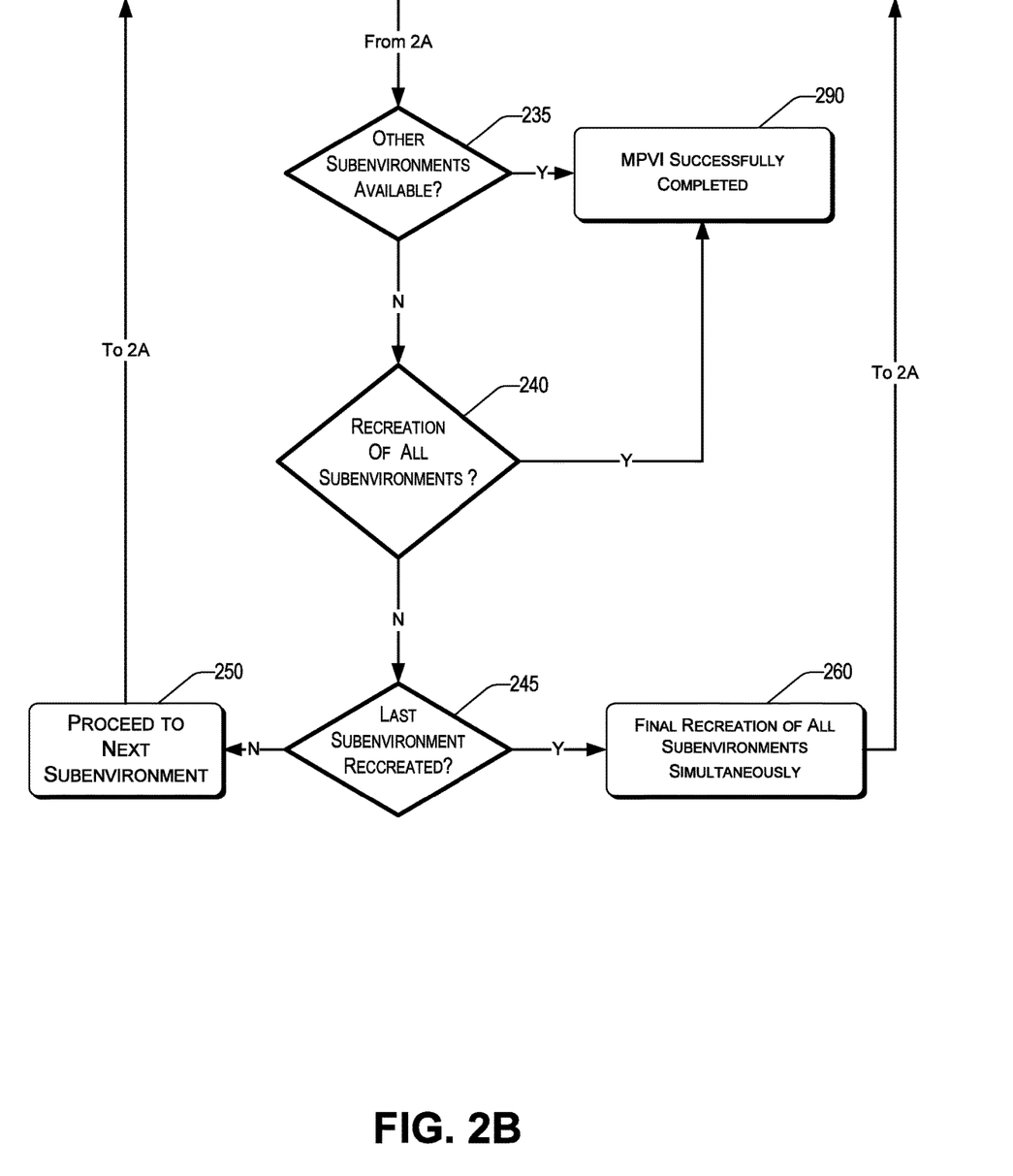
Figure 3:
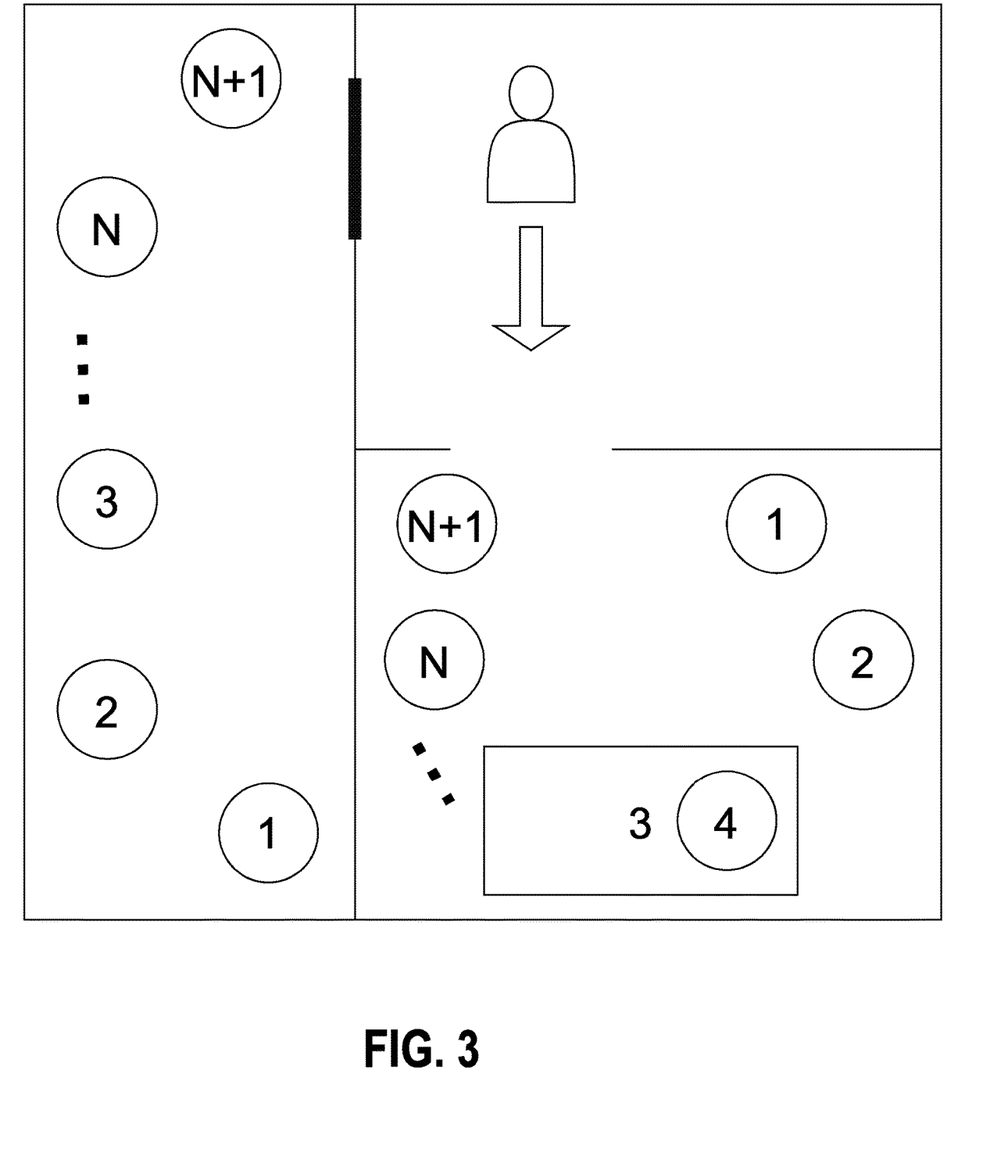
FIGS. 3-10 are a plurality of diagrammatic views of virtual reality rooms and scenarios diagramming progression through a virtual reality based memorization training session according to an embodiment of the subject technology.
Figure 4:
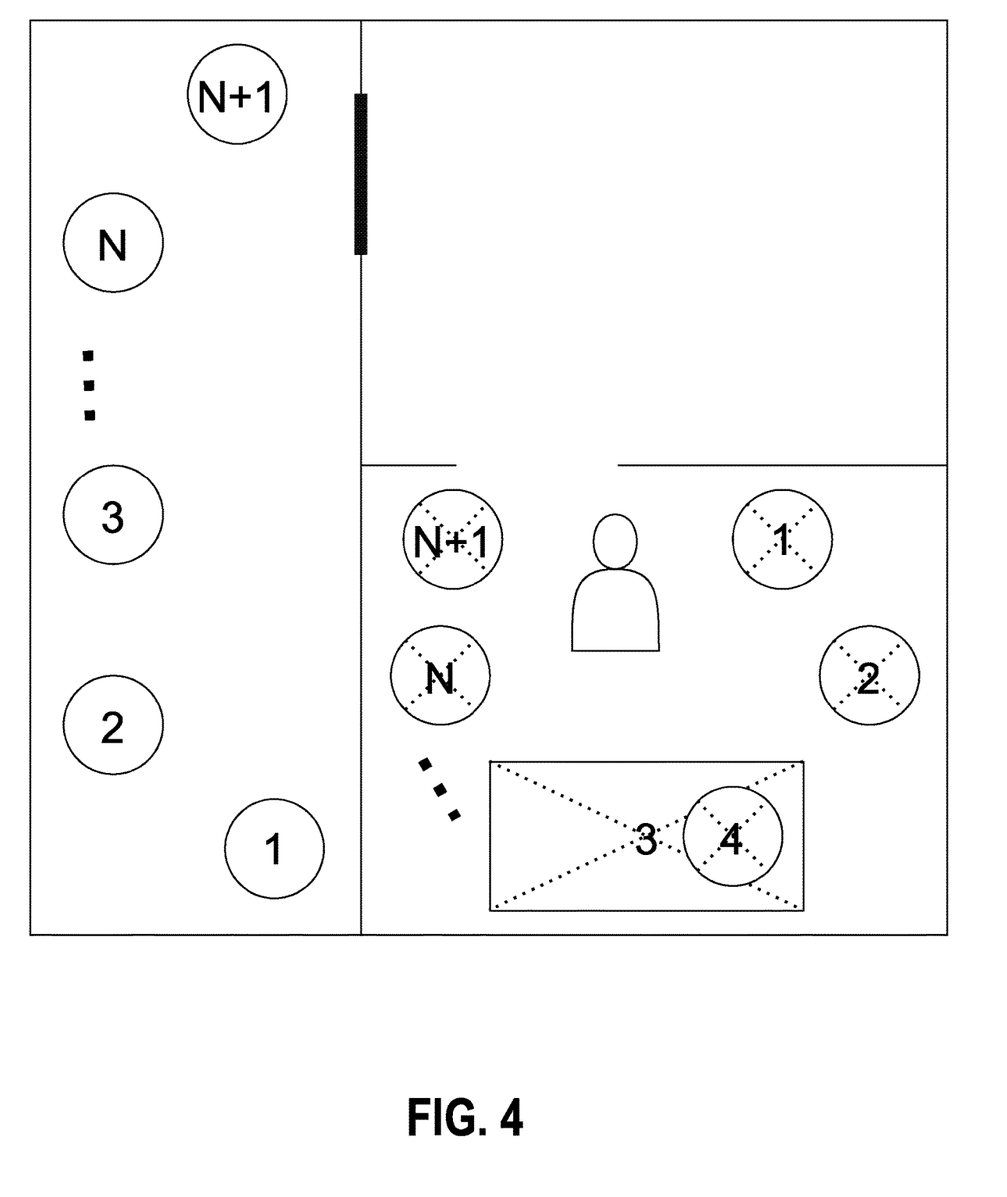
Figure 5:
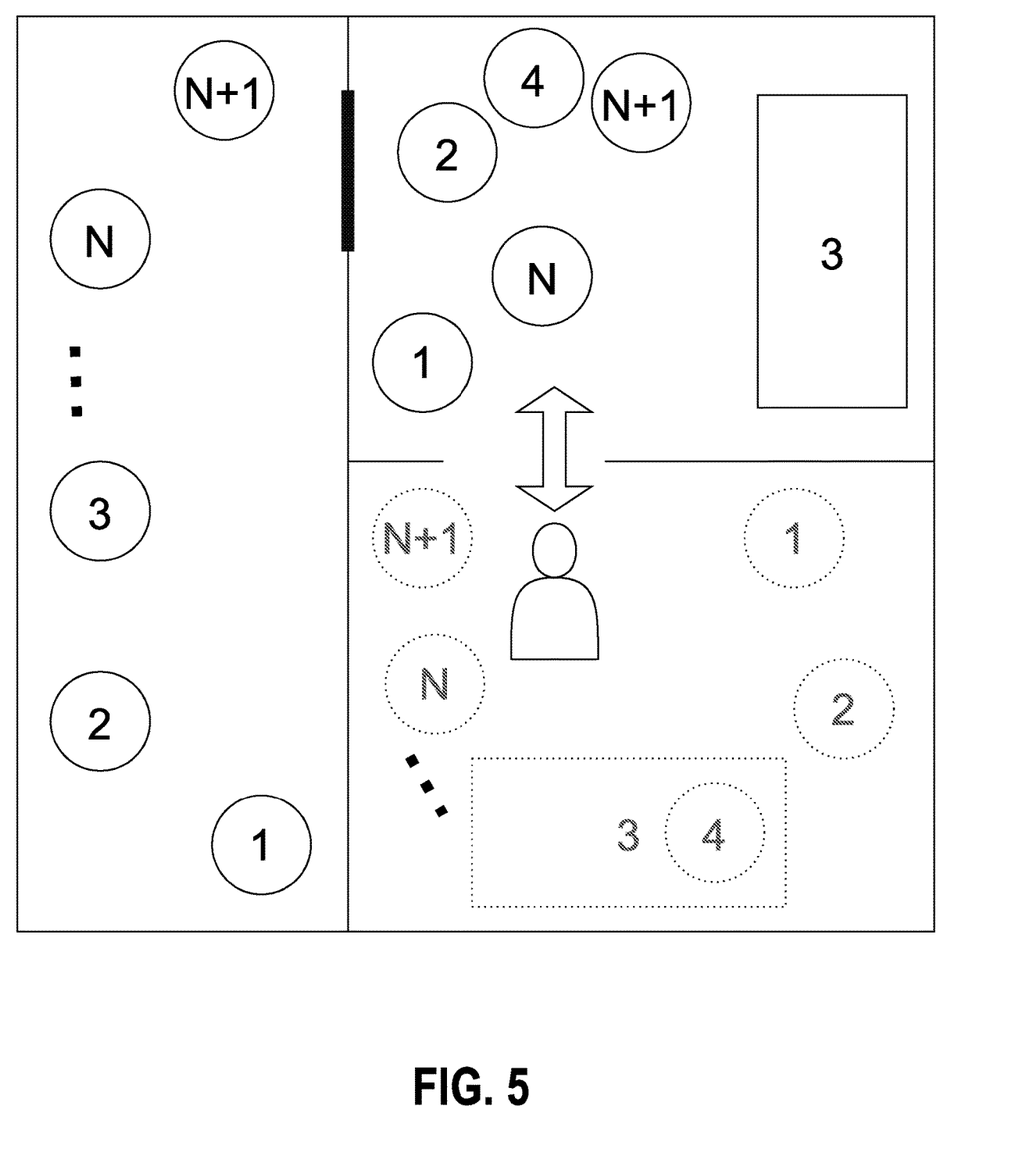
Figure 6:
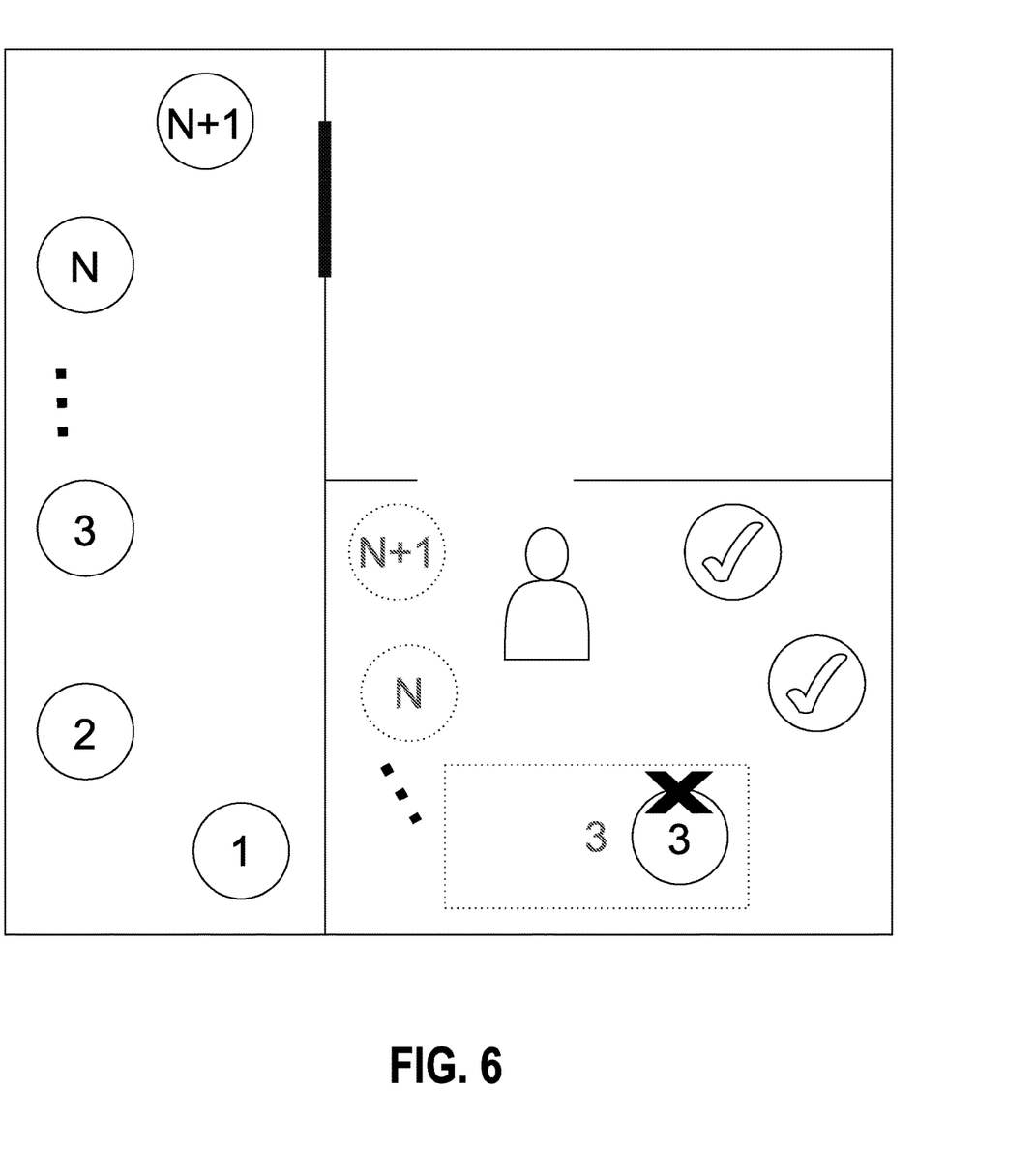
Figure 7:
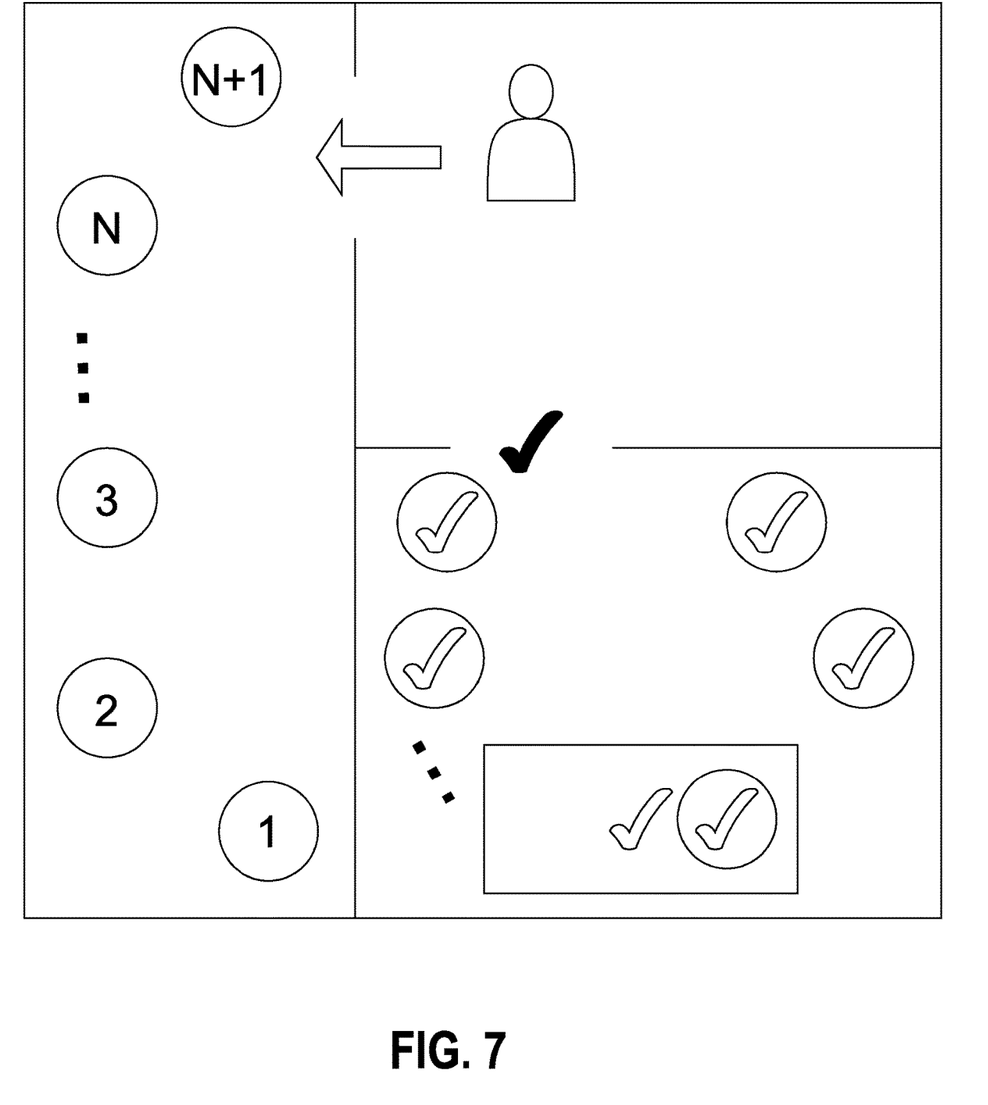
Figure 8:
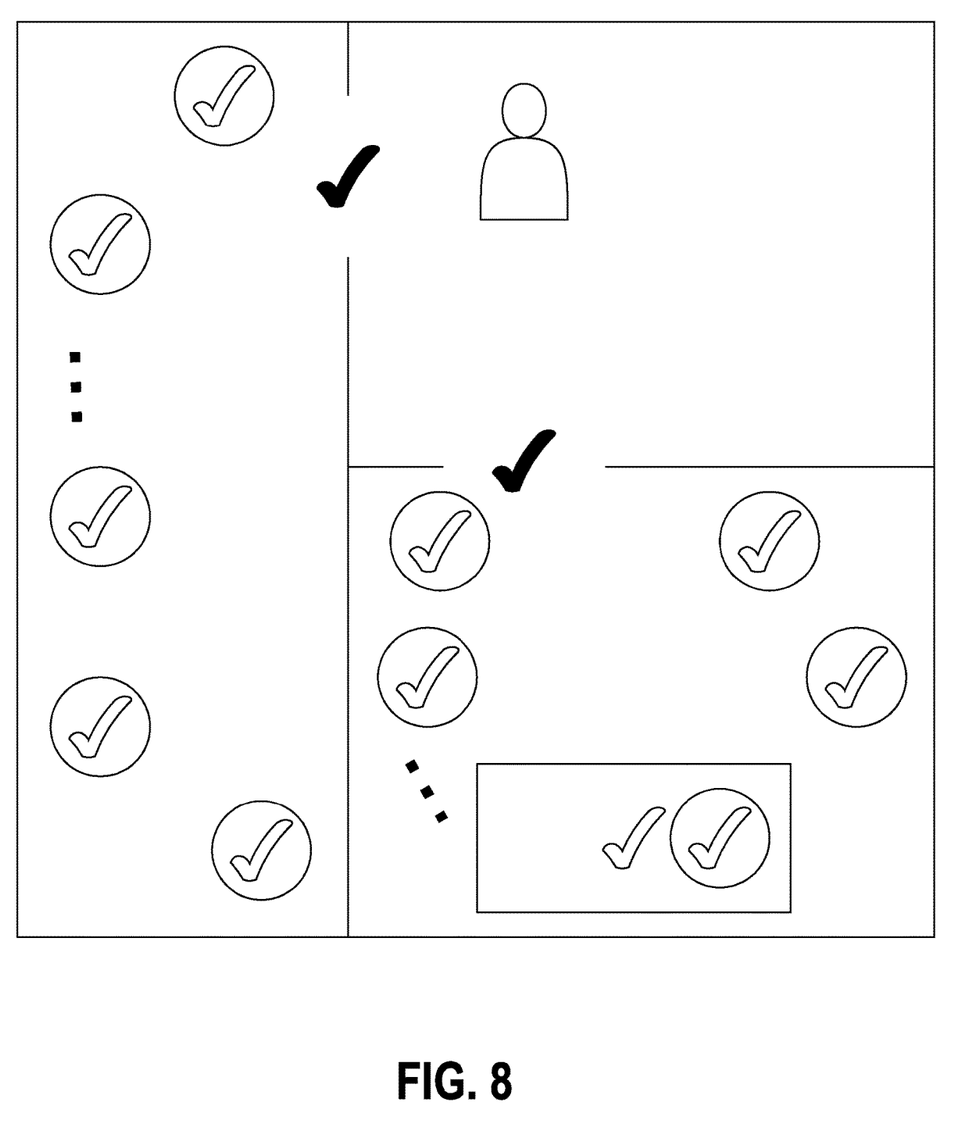
Figure 9:
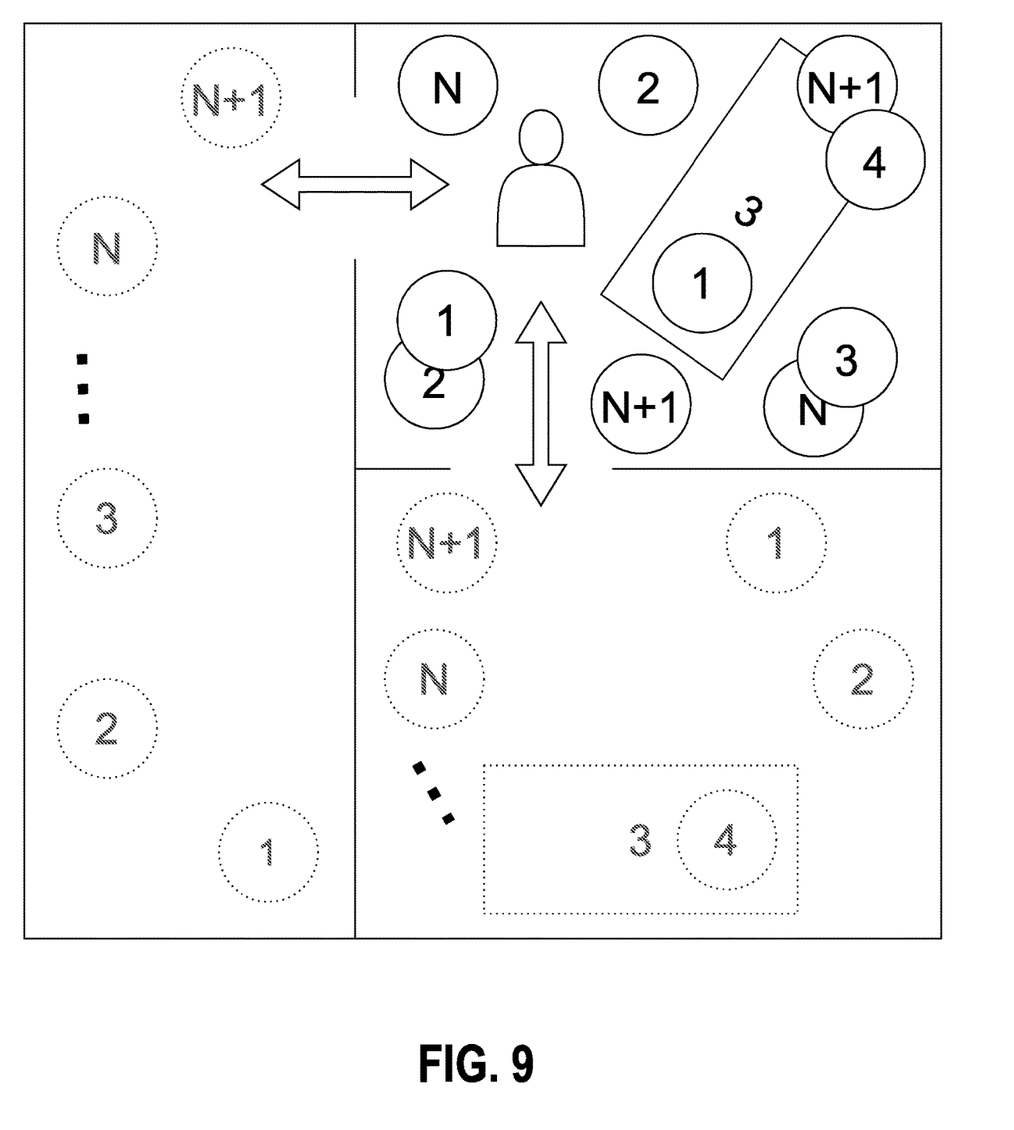
Figure 10:
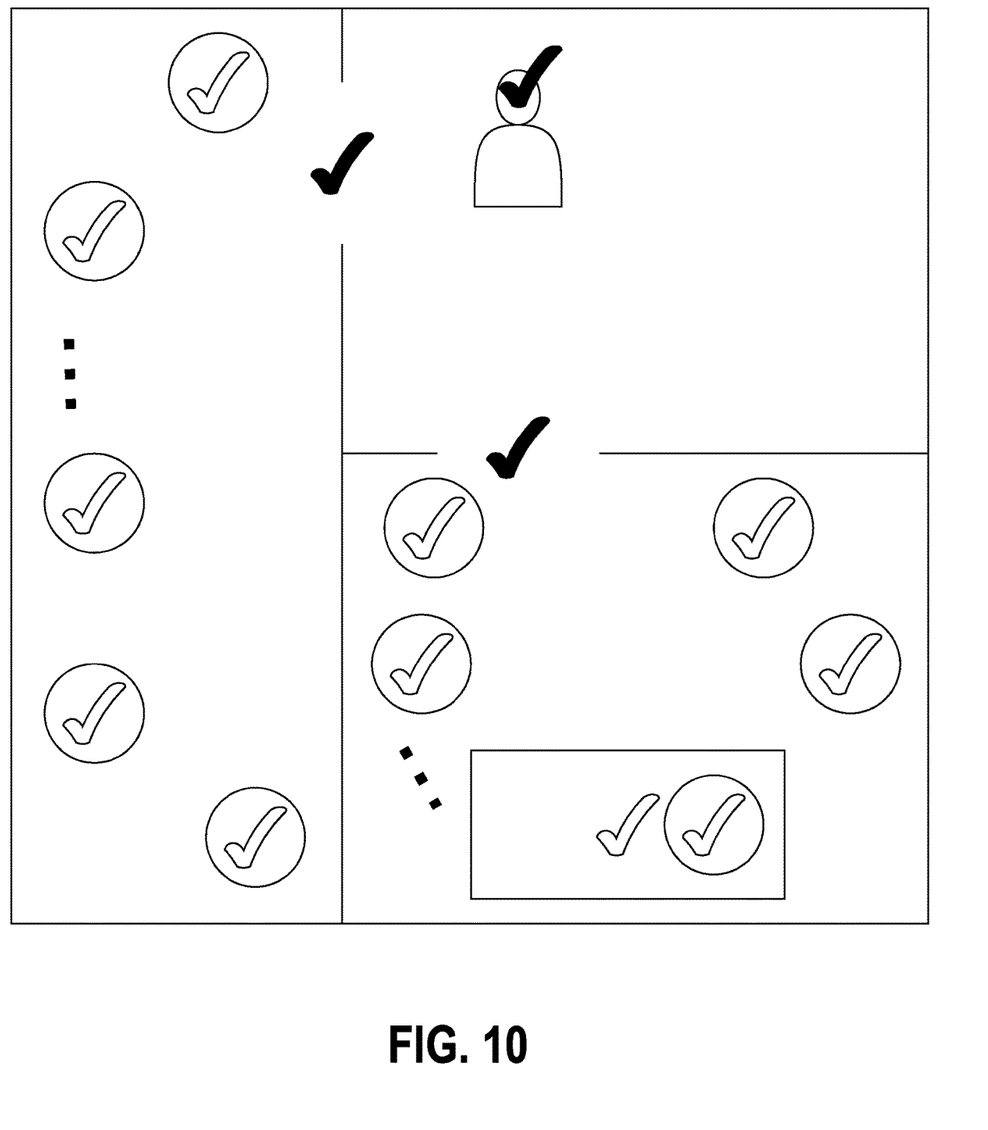

Referring now to FIGS. 2A and 2B, a process 200 for providing a memorization training experience though a digital environment is shown. In an exemplary embodiment, the user 201 accesses memorization training through a computing device which is loaded with a software program. In some embodiments, the memorization training uses a mind palace technique which generates a plurality of digital rooms. The process generates an assortment of digital (sometimes, three dimensional) objects which are placed in tracked or pre-defined locations of digital rooms. In general, the user practices associating the digital objects and their locations in a room. The user may engage in the subject digital training through the computing device which may be for example, a mobile smart phone, a personal computer, a laptop, a tablet computer, or a programmable consumer device (for example, a virtual reality headset or room, smart wearable glasses, watches, or jewelry, a smart television, entertainment hub, or brain-computer interface (BCI)). In the context of virtual reality or augmented reality, the digital rooms and objects may be virtual rooms and/or objects. In an augmented reality setting, a user may see a real life room with virtual objects generated and shown in different physical locations of the room. In an immersive virtual reality setting, the entire room may be generated, and the virtual objects may be positioned at pre-determined markers of the virtual room. From herein, use of the term "virtual" may refer to any digital environment described above which may include two and three dimensional environments.

The process 200 may generally be grouped into two main steps: encoding 205 and recreation 220. Encoding includes blocks 206, 208, and 210. The Recreation phase includes the remaining blocks until the process of a memorization session is completed.

To assist in illustrating the process 200, FIGS. 3-10 show a sequence of scenarios the user 201 may experience while engaged in a training session. Accordingly, reference to the process steps will be made concurrently with the accompanying scenarios to better illustrate the subject technology.

Generally, once the user 201 engages with a computing device, the user 201 appears in a virtual environment that may be divided into several "subenvironments". In some embodiments, the virtual environment may resemble a house (environment) or other building structure with rooms (subenvironments). Other embodiments may generate an outdoors environment with any kind of separation into sub-zones (subenvironments).

As an example, the user accesses the virtual environment, an apartment with three subenvironments, two rooms with objects inside (here and further "rooms") applicable for use in the memory techniques and a technical subenvironment (further "technical location"), which may be for example a hallway (lobby) or empty room for the technical purposes (e.g. free space for manipulation with objects).

The user proceeds to the "encoding" stage 205. On this stage the user gains access to a first room as the VR memorization room engine 110 generates and presents 206 a virtual room to the user 201. See for example, room scenario "1" in FIG. 3.

Other rooms may remain closed or inaccessible until the current room is recreated by the user. This stage includes a set of actions from the user. The actions may include: exploring the room; remembering 208 the objects inside the room; interacting with objects (which may include for example, activating/stopping an animation of the object for better memorization); confirming (or indicating) 210 the intent to recreate the room which launches the "recreation" stage 220. See room scenarios 2 and 3 in FIGS. 4 and 5.

In the recreation stage 220, objects disappear from their spots of a previously explored room (for example, the VR memorization room engine 110 removes 222 the objects from display). Objects reappear 224 in random places, in a technical location, or in a virtual user's inventory/vault and are available to be picked up (or selected from inventory) by the user 201. The user 201 then collects these objects (or selects from the virtual inventory) and tries to place them back to their initial corresponding spots as arranged in the previously explored room. The VR memorization room engine 110 receives 226 the user selection of an object. As the user 201 manipulates the object for placement, the VR memorization room engine 110 receives 228, the location of object placement. Objects may be placed in any direction/sequence within a space, including for example, both clockwise and counterclockwise placements, as well as non-sequential placement of items back in their corresponding spot.

The VR memorization room engine 110 may determine 230 whether an object was placed back in its original location when the user 201 was first presented the environment to memorize. When an incorrect spot is selected for the object (see for example, room scenario "4" in FIG. 6 where object 4 was incorrectly placed), all previously placed correctly objects may vanish and reappear in the technical location or directly inside the digital inventory, available to be picked up again. In some embodiments, when an incorrect spot is selected for the object (see for example, room scenario "4" in FIG. 6 where object 4 was incorrectly placed) previously placed correctly objects may stay in places, and the user may be required to try to place the object again repeating blocks 226 and 228. The user 201 may repeat the recreation until all objects are placed in the correct corresponding spots, which the VR memorization room engine 110 determines 230 as a successful recreation of the room. See for example, room scenario "5" in FIG. 7. In some embodiments, once a room is successfully recreated, the VR memorization room engine 110 determines 235 whether a next room becomes available for the encoding and recreation. See room scenario "5" again which shows a door (or other obstruction) being removed that permits the user access to an adjoining room. The VR memorization room engine 110 may, in some embodiments, register 290 the successful memorization of a room. The VR memorization room engine 110 determines 240 whether all subenvironments have been completed. In some embodiments, the VR memorization room engine 110 determines 245 whether the last room was the final subenvironment available in the overall environment. If not, the VR memorization room engine 110 proceeds 250 to the next available subenvironment and repeats the processes of user selection, object placement, and confirmation of room memorization as needed until the last subenvironment is reached and completed.

When the VR memorization room engine 110 determines 240 all rooms (subenvironments) in the available overall environment are successfully recreated (see for example, room scenario "6" in FIG. 8), the user may perform 260 a final recreation. See for example, room scenario "7" in FIG. 9. If the overall environment is too large, it may be divided into clusters of rooms and final recreation will be applied not to the whole environment, but to the cluster. A "final recreation" may be for example, the recreation of all rooms in the environment (or cluster) at once. All previously memorized objects from all rooms are gone from their spots in each room and appear in the technical location or in the digital inventory. The user may collect the objects and place them in their initial spots in all rooms (to recreate the whole environment or cluster) at once. The correct recreation of the whole environment indicates the end of the required user actions. The virtual environment was successfully "transferred" inside the user's mind as a virtual mind palace. See for example room scenario "8" in FIG. 10. In embodiments where the environment consists of a single room, a final recreation stage may be unnecessary.

Some embodiments may include a user builder mode. A user builder mode may include a user interface configured to allow users to construct their own rooms or zones with digital objects tethered to locations in the user's construct. The locations may be pre-defined by the underlying software or may be user marked. Operation of a user-built room/zone may operate according to the same process as described above where users may retrieve objects from a technical location or digital inventory and place them in the user-built room/zone to recreate the user-built scene. User built rooms/zones may be made available to other users thus expanding the available memorization training content for all users.

Figure 11:
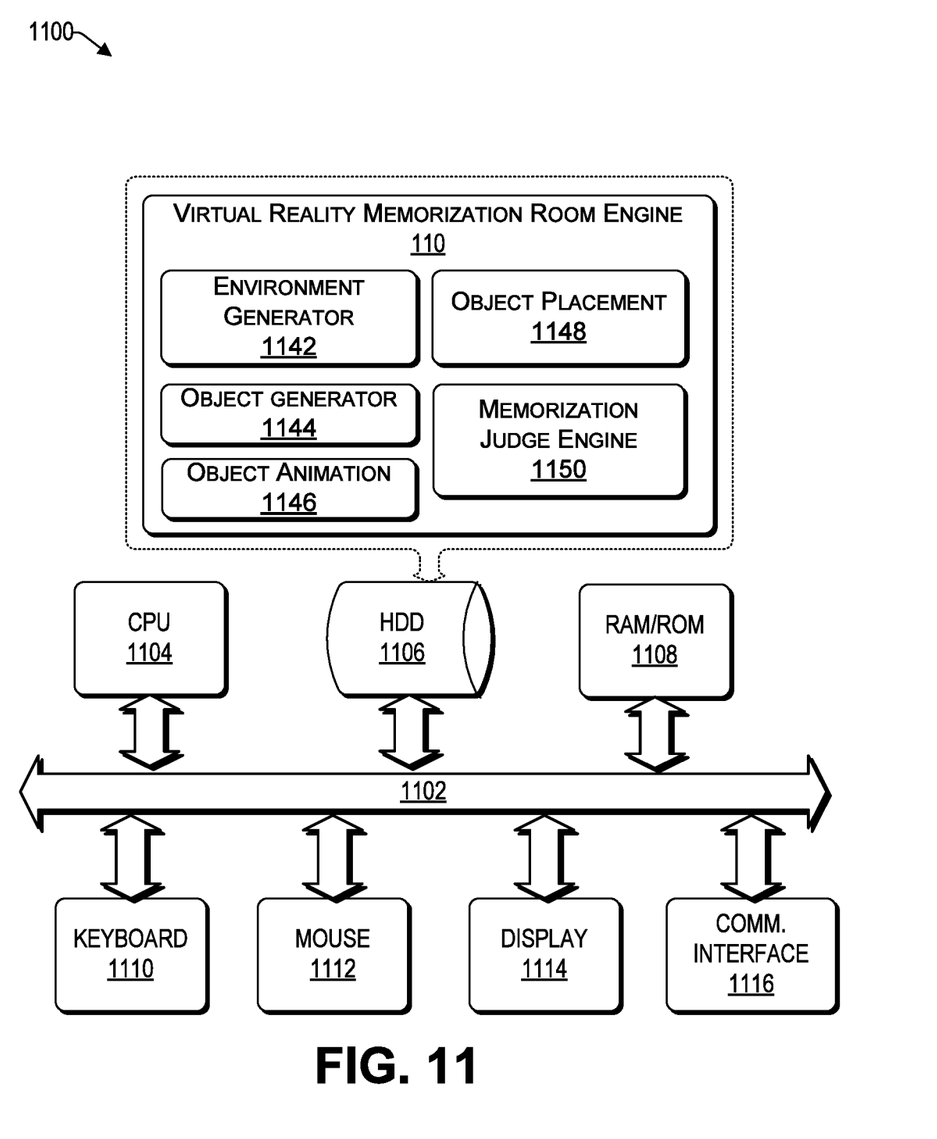
FIG. 11 is a block diagram of a computing system configured to provide a virtual reality memory training session according to an embodiment.

As discussed above, functions relating to virtual reality memorization training of the subject disclosure can be performed with the use of computing devices connected for data communication via wireless or wired communication, as shown in FIG. 1. FIG. 11 is a functional block diagram illustration of a particularly configured computer hardware platform that can communicate with various networked components, such as the computing device 102, VR server 116, or the cloud 120, etc. In particular, FIG. 11 illustrates a network or host computer platform 1100, as may be used to implement a server, such as the VR server 116 of FIG. 1.

The computer platform 1100 may include a central processing unit (CPU) 1104, a hard disk drive (HDD) 1106, random access memory (RAM) and/or read only memory (ROM) 1108, a keyboard 1110, a mouse 1112, a display 1114, and a communication interface 1116, which are connected to a system bus 1102.

In one embodiment, the HDD 1106, has capabilities that include storing a program that can execute various processes, such as the VR memorization room engine 110, in a manner described herein. The VR memorization room engine 110 may have various modules configured to perform different functions. For example, the VR memorization room engine 110 may include an environment generator module 1142 for creating environments and subenvironments, an object generator module 1144 for creating virtual objects, an object animation module 1146 for creating animation effects for each object, an object placement module 1148 configured to determine locations in environments, generate anchors, and associate objects with locations/anchors, and a memorization judge engine 1150 configured to determine correct placement of objects in environments based on object/location criteria association.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media may be utilized. In the context of this disclosure, a computer readable storage medium may be any tangible or non-transitory medium that can contain or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer program product for generating a memory training environment, the computer program product comprising a non-transitory computer readable storage medium having computer readable program code embodied therewith, the computer readable program code being configured, when executed by a processor, to:
   generate a digital environment including a first virtual room;
   generate a first set of digital objects in pre-defined locations of the first virtual room;
   display the first virtual room and the digital objects in the pre-defined locations to a user;
   receive an acknowledgement from the user that the user has memorized positions of each of the digital objects in the first virtual room;
   remove the digital objects from the first virtual room;
   collect the digital objects from a virtual inventory of the user;
   receive a selection of the digital objects by the user from the virtual inventory and placement of the digital objects in the first virtual room by the user;
   determine whether every digital object was placed in a correct location of the first virtual room, wherein the correct location corresponds to the pre-defined locations; and
   generate a second virtual room including a second set of digital objects in the event the user placed every object in the correct location of the first virtual room.

2. The computer program product of claim 1, wherein the computer readable program code is further configured to display the digital objects in random locations of the first virtual room after removal from the first virtual room.

3. The computer program product of claim 1, wherein the computer readable program code is further configured to generate an animation of one or more of the digital objects in response to the user selecting the one or more digital objects.

4. The computer program product of claim 1, wherein the computer readable program code is further configured to:
   determine an incorrect placement of one of the digital objects; and discard from placement any of the digital objects in the first virtual room in response to the determination of incorrect placement.

5. The computer program product of claim 1, wherein the computer readable program code is further configured to:
  receive a proposed construct of a user defined virtual room; and
  generate the first virtual room based on the user defined virtual room.

6. The computer program product of claim 5, wherein the computer readable program code is further configured to:
  receive a user defined location in the user defined virtual room; and
  tether a user selected object to the user defined location.

7. The computer program product of claim 1, wherein the computer readable program code is further configured to:
  generate an object vault, wherein the digital objects in the first virtual room are stored in accompaniment with other digital objects that were not in the first virtual room; and wherein
  the selection of the digital objects for placement in the first virtual room is performed by selecting the digital objects from the object vault and selecting the digital objects from amongst the other digital objects that were not in the first virtual room.

8. A computer implemented method of generating a memory training environment, comprising:
  generating a digital environment including a first virtual room;
  generating a first set of digital objects in pre-defined locations of the first virtual room;
  displaying the first virtual room and the digital objects in the pre-defined locations to a user;
  receiving an acknowledgement from the user that the user has memorized positions of each of the digital objects in the first virtual room;
  removing the digital objects from the first virtual room;
  generating an object vault, wherein the digital objects removed from the first virtual room are stored with other digital objects that were not in the first virtual room in the object vault;
  receiving a selection from the user of the digital objects performed by selecting the digital objects from the object vault and selecting the digital objects from amongst the other digital objects that were not in the first virtual room;
  receiving a placement of the selected digital objects from the object vault, into the first virtual room by the user;
  determining whether every selected digital object was placed in a correct location of the first virtual room, wherein the correct location corresponds to the pre-defined locations; and
  generating a second virtual room including a second set of digital objects in the event the user placed every object in the correct location of the first virtual room.

9. The method of claim 8, further comprising displaying the digital objects in random locations of the first virtual room after removal from the first virtual room.

10. The method of claim 8, further comprising generate an animation of one or more of the digital objects in response to the user selecting the one or more digital objects.

11. The method of claim 8, further comprising:
  determining an incorrect placement of one of the digital objects; and
  discarding from placement any of the digital objects in the first virtual room in response to the determination of incorrect placement.

12. The method of claim 8, further comprising:
  receiving a proposed construct of a user defined virtual room; and
  generating the first virtual room based on the user defined virtual room.

13. The method of claim 12, further comprising:
  receiving a user defined location in the user defined virtual room; and
  tethering a user selected object to the user defined location.

* * * * *